(12) United States Patent
Liu

(10) Patent No.: US 11,068,204 B2
(45) Date of Patent: Jul. 20, 2021

(54) MEMORY DEVICE WITH MULTIPLE PHYSICAL SPACES, MULTIPLE NON-VOLATILE MEMORY ARRAYS, MULTIPLE MAIN DATA, MULTIPLE METADATA OF MULTIPLE TYPES OF COMMANDS, AND ACCESS METHOD THEREOF

(71) Applicant: MACRONIX INTERNATIONAL CO., LTD., Hsinchu (TW)

(72) Inventor: Yi-Chun Liu, Zhubei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 16 days.

(21) Appl. No.: 16/419,086

(22) Filed: May 22, 2019

(65) Prior Publication Data
US 2020/0371710 A1 Nov. 26, 2020

(51) Int. Cl.
*G06F 3/06* (2006.01)
*G06F 12/02* (2006.01)

(52) U.S. Cl.
CPC .......... *G06F 3/0659* (2013.01); *G06F 3/061* (2013.01); *G06F 3/0679* (2013.01); *G06F 12/0246* (2013.01)

(58) Field of Classification Search
CPC .... G06F 3/0659; G06F 3/061; G06F 12/0246; G06F 3/0679; G06F 2212/7201
USPC .............................................. 711/5, 206, 154
See application file for complete search history.

(56) References Cited

U.S. PATENT DOCUMENTS

| | | | | |
|---|---|---|---|---|
| 5,014,195 A | * | 5/1991 | Farrell | G06F 12/0864 365/230.01 |
| 2005/0160234 A1 | * | 7/2005 | Newburn | G06F 12/0802 711/144 |
| 2007/0239938 A1 | * | 10/2007 | Pong | G06F 12/0895 711/122 |
| 2009/0129138 A1 | * | 5/2009 | Sumita | G06F 12/0893 365/72 |
| 2013/0329491 A1 | * | 12/2013 | Chang | G11C 11/005 365/185.03 |
| 2015/0113212 A1 | * | 4/2015 | Hiratsuka | G06F 3/0613 711/103 |
| 2016/0048448 A1 | * | 2/2016 | Kwon | G06F 12/0292 711/103 |
| 2017/0010817 A1 | * | 1/2017 | Lim | G06F 12/0246 |
| 2018/0165205 A1 | * | 6/2018 | Sasanka | G06F 12/128 |
| 2018/0335827 A1 | * | 11/2018 | Ishiwata | G06F 3/0626 |
| 2020/0050400 A1 | * | 2/2020 | Kim | G06F 3/0685 |

* cited by examiner

*Primary Examiner* — Hong C Kim
(74) *Attorney, Agent, or Firm* — McClure, Qualey & Rodack, LLP

(57) ABSTRACT

A memory device and an access method applied to the memory device are provided. The memory device is electrically connected to a host, and the memory device includes a memory circuit and a memory controller. The memory circuit includes a first memory array and a second memory array. The first memory array and the second memory array respectively provide a first physical space and a second physical space. The memory controller receives an access command from the host. The memory controller performs the access command to the first physical space when the access command is a first type of command, and the memory controller performs the access command to the second physical space when the access command is a second type of command.

19 Claims, 11 Drawing Sheets

MEMORY DEVICE WITH MULTIPLE PHYSICAL SPACES, MULTIPLE NON-VOLATILE MEMORY ARRAYS, MULTIPLE MAIN DATA, MULTIPLE METADATA OF MULTIPLE TYPES OF COMMANDS, AND ACCESS METHOD THEREOF

BACKGROUND

Field

The disclosure relates in general to a memory device and associated access method, and more particularly to a memory device and associated access method storing data in response to application attributes.

Description of the Related Art

In embedded systems, non-volatile memories such as flash memories are typically used in electronic devices as storage media because the non-volatile memories can retain data even if power is off and consume relatively less power. However, different applications executed by the electronic devices have different functions so that conflicts of accessing the flash memories may happen. Sometimes, such conflicts of accessing the flash memories might cause the performance issues of the electronic devices.

SUMMARY

The disclosure is directed to a memory device and an associated access method.

According to a first aspect of the present disclosure, a memory device is provided. The memory device is electrically connected to a host. The memory device includes a memory circuit and a memory controller. The memory circuit includes a first memory array and a second memory array. The first memory array is configured to provide a first physical space, and the second memory array is configured to provide a second physical space. The memory controller is configured to receive an access command from the host. The memory controller performs the access command to the first physical space when the access command is a first type of command, and the memory controller performs the access command to the second physical space when the access command is a second type of command.

According to a second aspect of the present disclosure, an access method applied to a memory device including a first memory array and a second memory array is provided. The memory device is electrically connected to a host. The access method includes the following steps. Firstly, a first physical space is provided by the first memory array, and a second physical space is provided by the second memory array. Then, an access command is received from the host. The access command is performed to the first physical space when the access command is a first type of command, and the access command is performed to the second physical space when the access command is a second type of command.

The above and other aspects of the disclosure will become better understood with regard to the following detailed description of the preferred but non-limiting embodiment(s). The following description is made with reference to the accompanying drawings.

DETAILED DESCRIPTION

Figure 1:
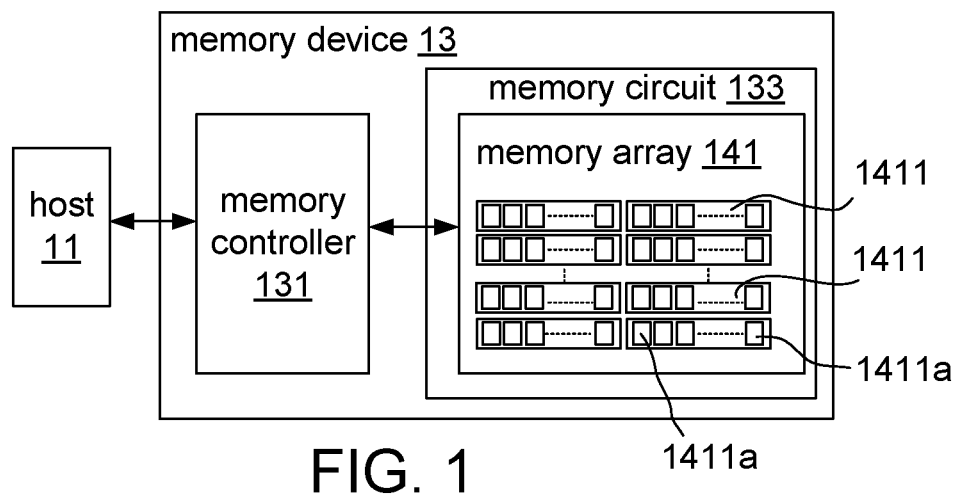
FIG. 1 is a block diagram illustrating an electronic device using a memory device.

FIG. 1 is a block diagram illustrating an electronic device using a memory device. The electronic device 10 includes a host 11 and a memory device 13, and the memory device 13 further includes a memory controller 131 and a memory circuit 133. The memory circuit 133 includes one or more memory array 141. The memory array 141 includes plural blocks 1411 and each block 1411 includes plural pages 1411a. The memory array 141 includes flash memories, for example, NAND flash memories, NOR flash memories, and so forth.

The communication data between the host 11 and the memory device 13 can be classified into metadata and main data (requested data or user data). The metadata provides general information on file systems, specific attributes of files and directories, logging information of the memory arrays and/or storage locations of the main data.

In the specification, the main data are represented in symbols with capital letters, and the metadata are represented in symbols with lower case letters. Moreover, the main data and its corresponding metadata are represented with the same number. For example, the metadata a1 represents the metadata corresponding to the main data A1.

For the sake of illustration, sizes of different metadata are assumed to be the same, and sizes of different main data are assumed to be the same. Furthermore, in practical design, each of the main data A1, A2, Am may be stored to less than, equivalent to, or more than one block, so as the metadata a1, a2, am. It is possible that storage locations of the metadata and the main data are spread in the memory device. The access method of the memory device in the disclosure can be applied to the scenarios that main data/metadata have different sizes as well, and details about such applications are not described to avoid redundancy.

Figure 2:
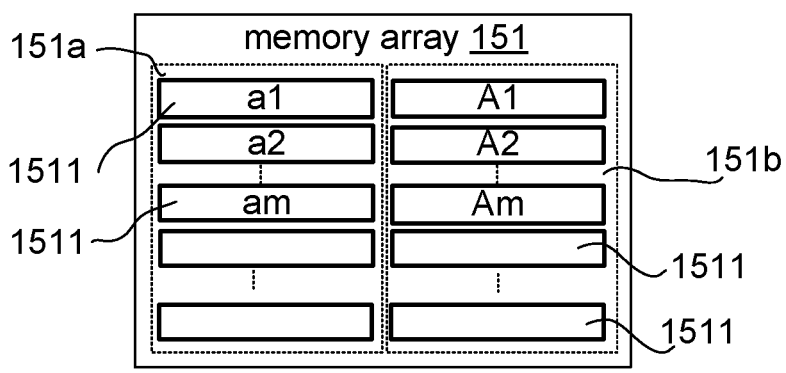
FIG. 2 is a schematic diagram illustrating an exemplary configuration of the memory array in which some blocks are reserved for storing metadata.

FIG. 2 is a schematic diagram illustrating an exemplary configuration of the memory array in which some blocks are reserved for storing metadata. The blocks in the memory array 151 can be classified into two groups 151a, 151b. The blocks 1511 in the group 151a are reserved for storing metadata a1, a2, am, and the blocks 1511 in the group 151b are reserved for storing main data A1, A2, Am.

Figure 3:
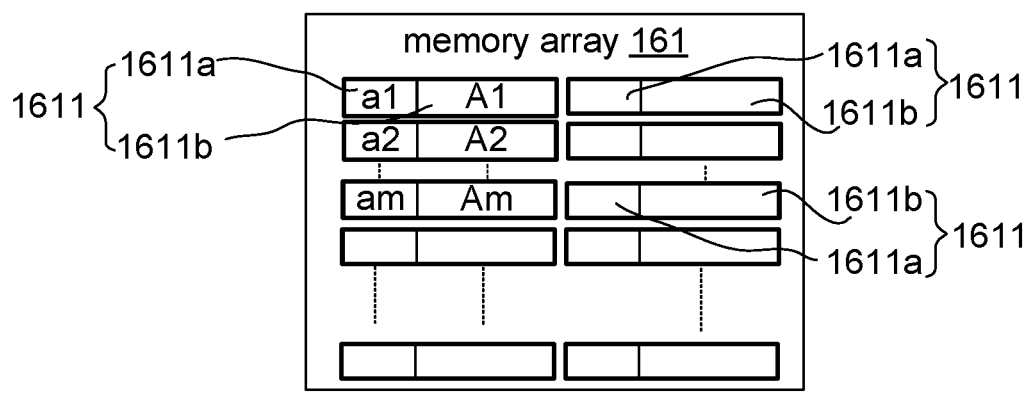
FIG. 3 is a schematic diagram illustrating an exemplary configuration of the memory array in which each block has some reserved space for storing metadata.

FIG. 3 is a schematic diagram illustrating an exemplary configuration of the memory array in which each block has some reserved space for storing metadata. In each of the blocks 1611, one or more pages 1611a are reserved for storing metadata and the reset pages 1611b are reserved for storing main data. For example, the metadata a1 and the main data A1 are stored at the same block 1611.

Figure 4:
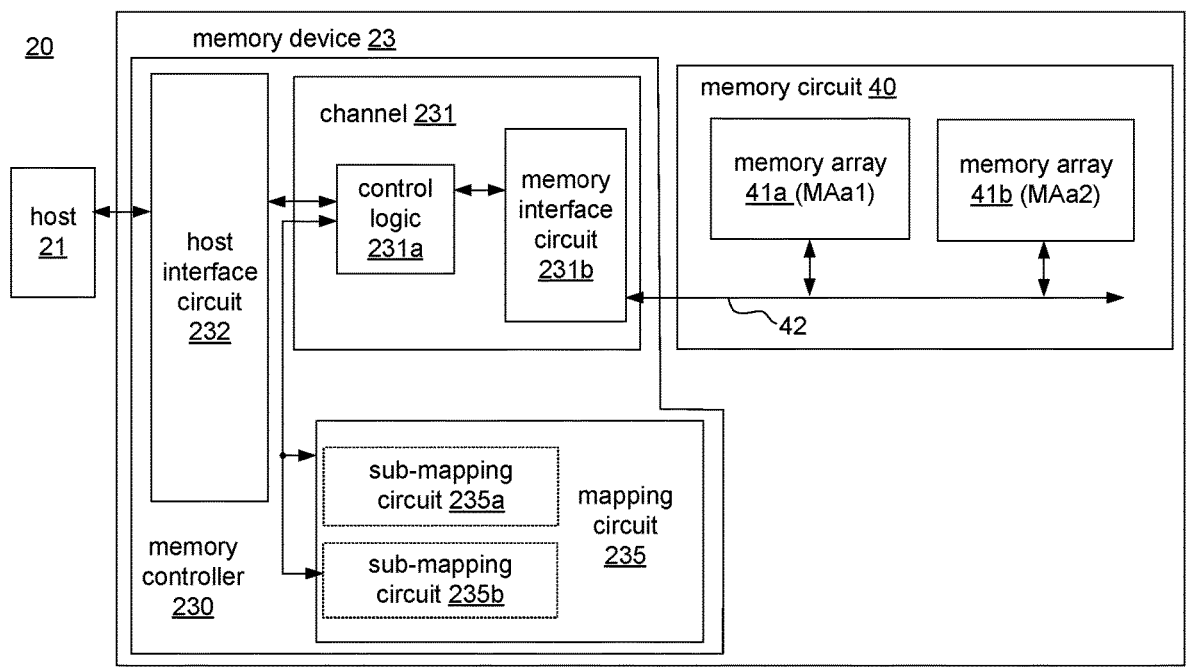
FIG. 4 is a block diagram illustrating an electronic device using a memory device including two memory arrays.

FIG. 4 is a block diagram illustrating an electronic device using a memory device including two memory arrays. The electronic device 20 includes a host 21 and a memory device 23, and the memory device 23 includes a memory controller 230 and a memory circuit 40.

The memory controller 230 further includes a host interface circuit 232, a mapping circuit 235, and a channel 231, and the channel 231 includes a control logic 231a, and a memory interface circuit 231b. Depending on the type of the electronic device 20, the memory controller 230 may include multiple channels and the host interface circuit 232 may support different standards, such as an ATA interface, a SATA interface, an MMC interface, and so forth.

In FIG. 4, the memory arrays 41a (MAa1), 41b (MAa2) are electrically connected to the memory interface circuit 231b through a command/data bus 42, and the control logic 231a accesses the memory arrays 41a (MAa1), 41b (MAa2) through the memory interface circuit 231b and the command/data bus 42 in an interleaving manner, together with chip enable signals respectively corresponding to the memory arrays 41a (MAa1), 41b (MAa2). In practical application, the number of memory arrays corresponding to channel 231 is not limited. Details about access details between the control logic 231 and the memory arrays 41a (MAa1), 41b (MAa2) are omitted to avoid redundancy.

To raise the access speed of the memory circuit 40, the metadata stored at the memory arrays 41a (MAa1), 41b (MAa2) are scanned when the memory device 23 is mounted. In addition, the metadata stored at the memory array 41a (MAa1) and the metadata stored at the memory array 41b (MAa2) are copied to the sub-mapping circuits 235a, 235b, respectively. In practical application, the mapping circuit 235 can be implemented with an SDRAM, an NVM, or a combination of an SDRAM and an NVM.

During the mounting of the memory device 23, the metadata copied to the mapping circuit 235 are reconstructed based on a per-memory array manner. The metadata stored at the memory array 41a (MAa1) are copied to the sub-mapping circuit 235a, and the metadata stored at the memory array 41b (MAa2) are copied to the sub-mapping circuit 235b. In a case that the mapping circuit 235 is utilized, the control logic 231a should manage the data consistency between the copies of the metadata stored in the memory array 41a (MAa1) and the sub-mapping circuit 235a and the data consistency between the copies of the metadata stored in the memory array 41b (MAa2) and the sub-mapping circuit 235b. The management of the metadata consistency can be performed by utilizing commands such as "flush cache" and "cache write" etc. but details are not described.

Figure 5:
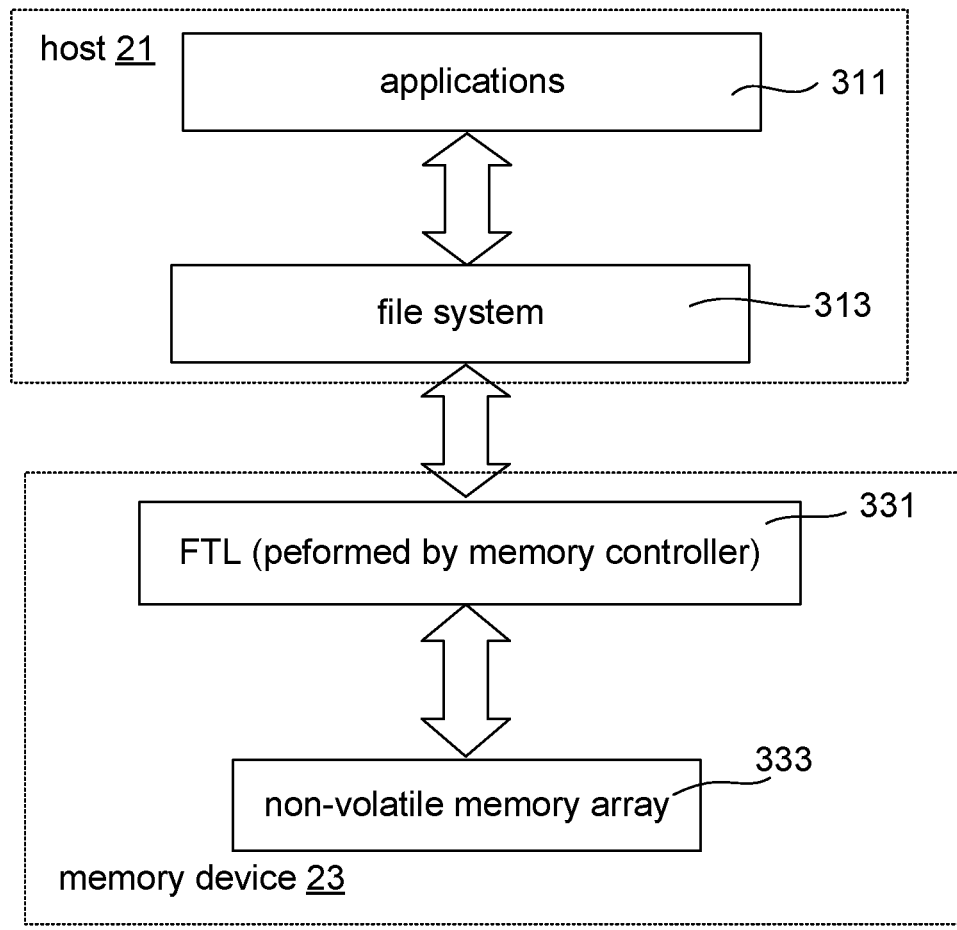
FIG. 5 is a schematic diagram illustrating the system architecture of the electronic device shown in FIG. 4.

FIG. 5 is a schematic diagram illustrating the system architecture of the electronic device shown in FIG. 4. The host 21 executes the applications (application programs/application software) 311 and the file system 313, and the memory controller 230 executes firmware operating as the flash translation layer (hereinafter, FTL) 331.

The FTL 331 handles the sequences of read, write, and erase operations of the non-volatile memory array 333. Moreover, the FTL 331 provides an address translation mechanism so that the logical addresses used by the host can be mapped to the physical addresses that existed in the memory device 23. In addition, the FTL 331 may provide garbage collection function and wear leveling function. The FTL 331 basically hides the operation tails of the memory device 23 and maximizes the performance and lifetime of the memory device 23.

The digital dashboard is usually equipped with GPS navigation systems so that the drivers can receive path instruction and excursion recording while driving. For the electronic device having the digital dashboard application, a special read-while-write access is performed to the memory device 23. The read-while-write access implies that two typical usages are involved, that is, a read-oriented usage such as map loading, and a write-oriented usage such as location recording (tracklogs). The read-oriented usage implies that the application generates only read commands CMDrd, and the write-oriented usage implies that the application generates only write commands CMDwr.

When the memory device 23 receives the read commands CMDrd, and the write commands CMDwr from the host 21, the memory controller 230 executes the read operation and the write operation, respectively. Due to the nature of flash memory, the execution of the write operation is much longer than the execution of the read operation. For example, the execution time of the write operation may be 10 times of the execution time of the read operation.

Although the data (main data and/or metadata) can be read or written in units of pages, a block is the smallest erase unit for flash memory. In a case that a block is selected for data programming, but its available pages are not sufficient for the data size, a block erase operation might be required before programming the data. Consequentially, the execution time of the write operation may result in postponing the execution time of the read operation, even if the write command CMDwr and the read command CMDrd actually originate from different applications of the host 21. For the digital dashboard, both the map loading application and the route recording application should continuously operate. If conflicts of memory array access happen often, such conflicts may cause performance issues of the digital dashboard.

Figure 6:
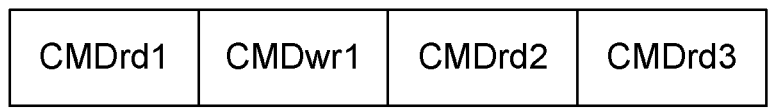
FIG. 6 is a schematic diagram illustrating an exemplary command sequence showing a possible condition in which the read command CMDrd and the write command CMDwr are interchangeably issued by the host.

FIG. 6 is a schematic diagram illustrating an exemplary command sequence showing a possible condition in which the read command CMDrd and the write command CMDwr are interchangeably issued by the host. The command queue 451 includes four continuous commands, a read command CMDrd1, a write command CMDwr1, a read command CMDrd2, and a read command CMDrd3.

When the memory device 23 receives the read commands CMDrd and the write command CMDwr alternatively, the conflict between writing the main data to and reading the main data from the same memory arrays 41a (MAa1), 41b (MAa2) results in excess delay time. Alternatively speaking, the performance of the memory circuit 40 is delayed if usages of the memory arrays 41a (MAa1), 41b (MAa2) are not well-managed.

By assuming that the write commands CMDwr and the read commands CMDrd are respectively issued by the route recording application and the map loading application, an access conflict thus occurs because the map loading application cannot start loading the map data from the memory array until the recording data generated by the route recording application have been completely programmed to the same memory array. In short, excess waiting time is required for executing the map loading application if the two applications jointly share the same memory arrays 41a (MAa1), 41b (MAa2).

To reduce the excess waiting time for the memory device performing the read operation, a memory access method is provided in the present disclosure. According to the embodiment of the present disclosure, the memory device provides different memory arrays for applications having different attributes to reduce the conflict between writing the main data to and reading the main data. To be more specific, the memory controller 230 internally defines that which of the memory arrays is/are specific for the write-oriented application and which of the other memory arrays is/are specific for the read-oriented application.

Figure 7:
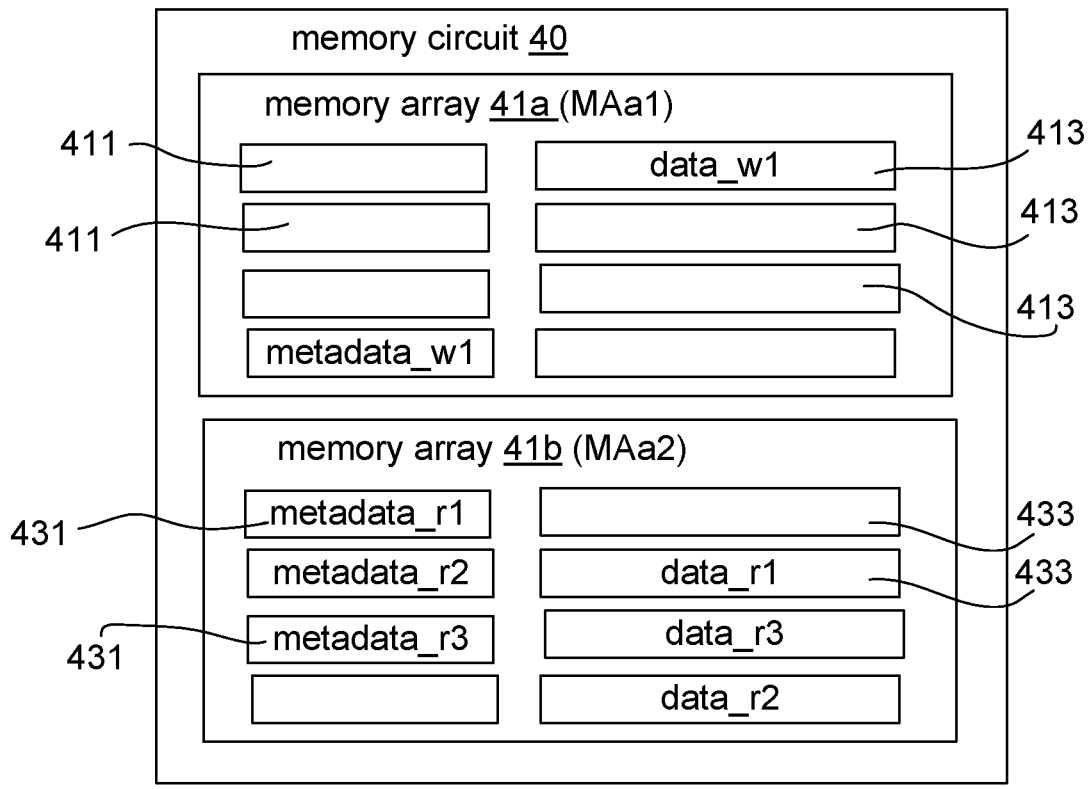
FIG. 7 is a schematic diagram illustrating that separate memory arrays in the memory circuit are reserved for applications having different attributes.

FIG. 7 is a schematic diagram illustrating that separate memory arrays in the memory circuit are reserved for applications having different attributes. The memory circuit 40 includes memory arrays 41a (MAa1), 41b (MAa2). In this embodiment, the memory array 41a (MAa1) is assumed to be reserved for (assigned to) the write operation, and the memory array 41b (MAa2) is assumed to be reserved for (assigned to) the read operation. In the memory array 41a (MAa1), the blocks 411 are reserved for (assigned to) the write metadata (for example, metadata_w1), and the blocks 413 are reserved for (assigned to) the write main data (for example, data_w1), In the memory array 41b (MAa2), the blocks 431 are reserved for (assigned to) the read metadata (for example, metadata_r1 metatdata_r2, metatdata_r3), and the blocks 433 are reserved for (assigned to) the read main data (for example, data_r1, data_r2, data_r3).

When the host executes the map loading application, only the read command CMDrd is repetitively issued and transmitted to the memory device 23. In response to the read command CMDrd, the memory controller 230 acquires the read metadata (metadata_r1, metadata_r2, metadata_r3) from the blocks 431 and the read main data (data_r1, data_r2, data_r3) from the blocks 433. That is, only the blocks 431, 433 in the memory array 41b (MAa2) are assigned for the map loading application.

When the host executes the route recording application, only the write command CMDwr is repetitively issued and transmitted to the memory device 23. In response to the write command CMDrd, the memory controller 230 programs the write main data (data_w1) to the blocks 413 and the write metadata (metadata_w1) to the blocks 411. That is, only the blocks 411, 413 in the memory array 41a (MAa1) are assigned for the route recording application.

Figure 8:
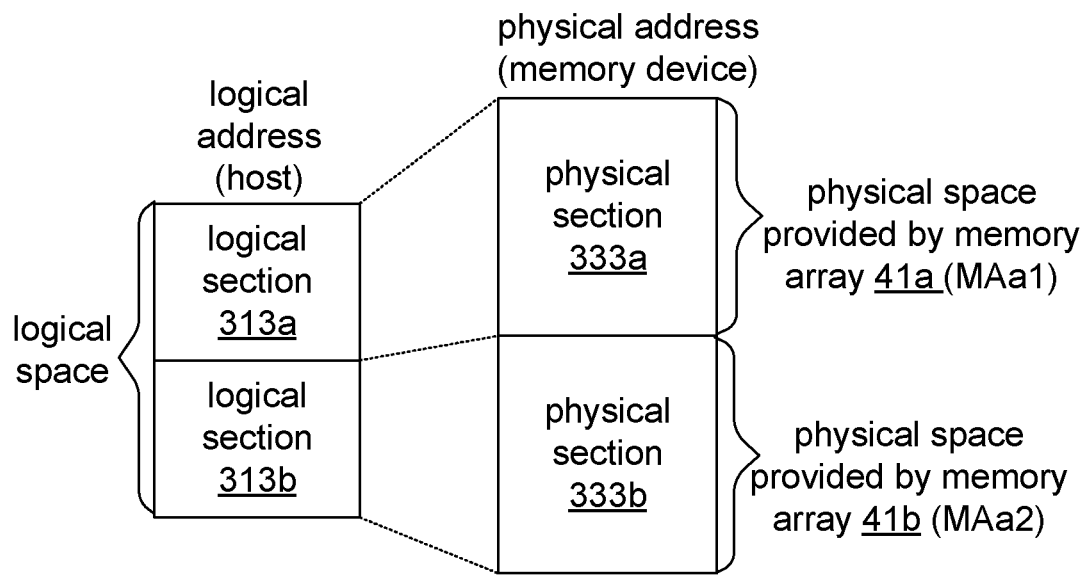
FIG. 8 is a schematic diagram illustrating an exemplary address translation mechanism applied to the memory circuit in FIG. 7.

FIG. 8 is a schematic diagram illustrating an exemplary address translation mechanism applied to the memory circuit in FIG. 7. The logical space seen by the host is assumed to be split into two logical sections 313a, 313b, which are respectively corresponding to the physical sections 333a, 333b. In addition, the physical sections 333a, 333b are respectively corresponding to the physical spaces provided by the memory arrays 41a (MAa1), 41b (MAa2).

Figure 9:
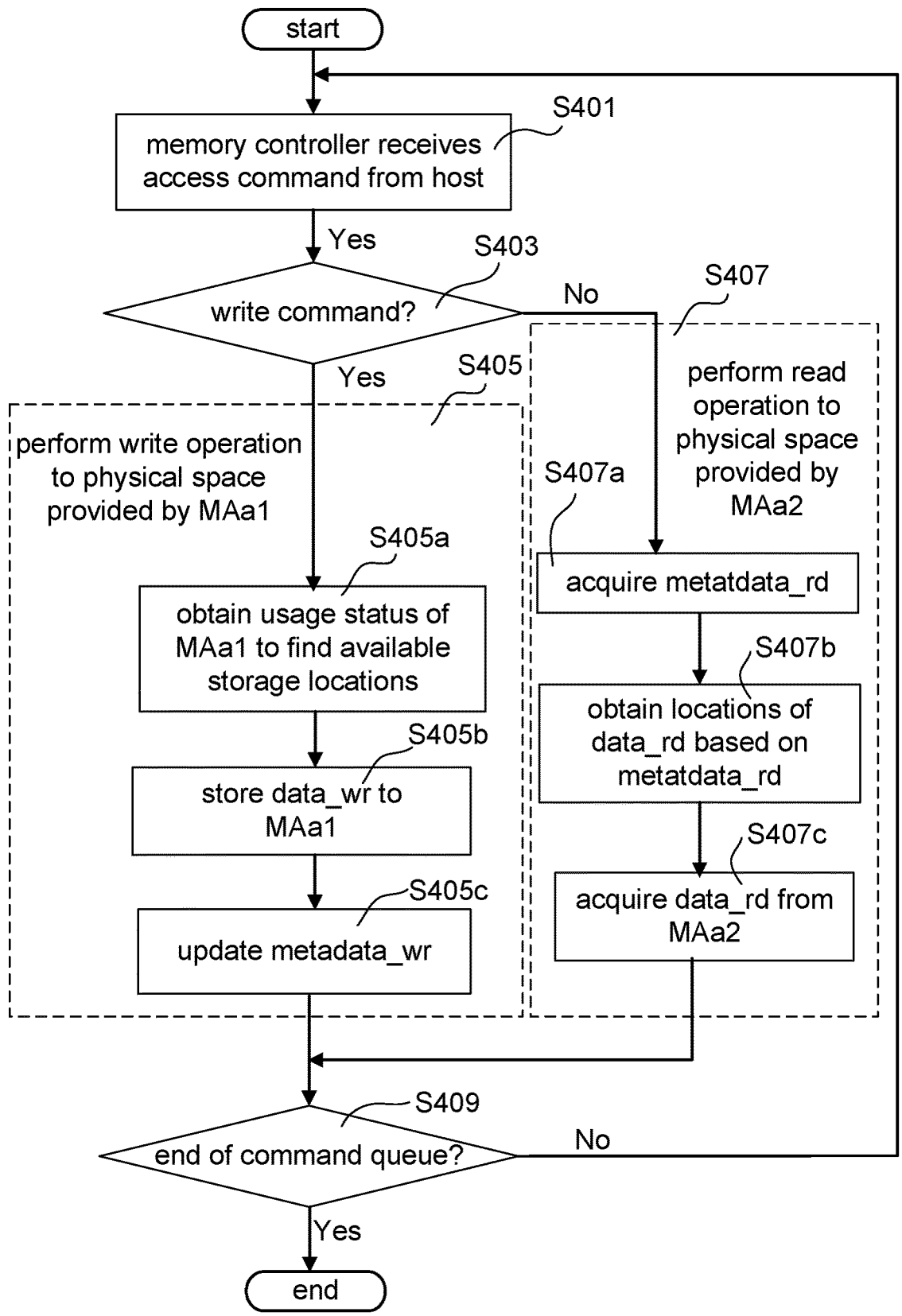
FIG. 9 is a flow diagram illustrating a command processing procedure when the memory device having the memory circuit in FIG. 7 receives an access command from the host.

FIG. 9 is a flow diagram illustrating a command processing procedure when the memory device having the memory circuit in FIG. 7 receives an access command from the host. Firstly, the memory controller 230 receives the access command from the host 21 (step S401), and the memory controller 230 further determines the type of the access command (step S403). In the specification, the access command is assumed to be a write command CMDwr or a read command CMDrd.

When the access command is confirmed to be a write command CMDwr, the memory controller 230 performs the write operation to the physical section 333a in response (step S405). The physical section 333a is provided by the memory array 41a (MAa1). The control logic 231a is in charge of the write operation, and step S405 further includes the following steps.

The control logic 231a obtains usage status of the memory array 41a (MAa1) to find suitable storage locations of the write main data (data_wr1) (step S405a), and then stores the write main data (data_wr1) to the physical section 333a provided by the memory array 41a (MAa1) (step S405b). At this moment, the storage locations of the write main data (data_wr1) are known. Then, the memory controller 230 updates and/or stores the write metadata (metadata_wr1) corresponding to the write main data (data_wr1) (step S405c). In practical applications that the memory device 23 including the mapping circuit 235, the memory controller 230 should take into account regarding metadata consistency between the memory array 41a (MAa1) and the sub-mapping circuit 235a.

When the access command is determined to be a read command CMDrd, the memory controller 230 performs the read operation to the physical section 333b in response (step S407). The physical section 333b is provided by the memory array 41b (MAa2). The control logic 231a is in charge of the read operation, and step S407 further includes the following steps.

The control logic 231a acquires read metadata (metadata_r1, metadata_r2, metadata_r3) from the memory array 41b (MAa2) (step S407a) and obtains storage locations of the read main data (data_r1, data_r2, data_r3) according to the read metadata (metadata_r1 metadata_r2, metadata_r3) (step S407b). Then, the control logic 231a acquires the read main data (data_r1, data_r2, data_r3) from the memory array 41b (MAa2) according to the read metadata (metadata_r1, metadata_r2, metadata_r3), respectively.

After steps S405, S407 are performed, the memory controller 230 determines if all commands in the command queue are performed (step S409). If the determination result of step S409 is positive, the flow ends. Otherwise, step S401 is repeatedly performed.

FIGS. 10A, 10B, 100, and 10D are schematic diagrams illustrating how the memory controller utilizes the memory circuit shown in FIG. 7 to react to the command queue shown in FIG. 6. As mentioned in FIG. 9, the memory array 41a is related to the write operation, and the memory array 41b is related to the read operation.

Figure 10A:
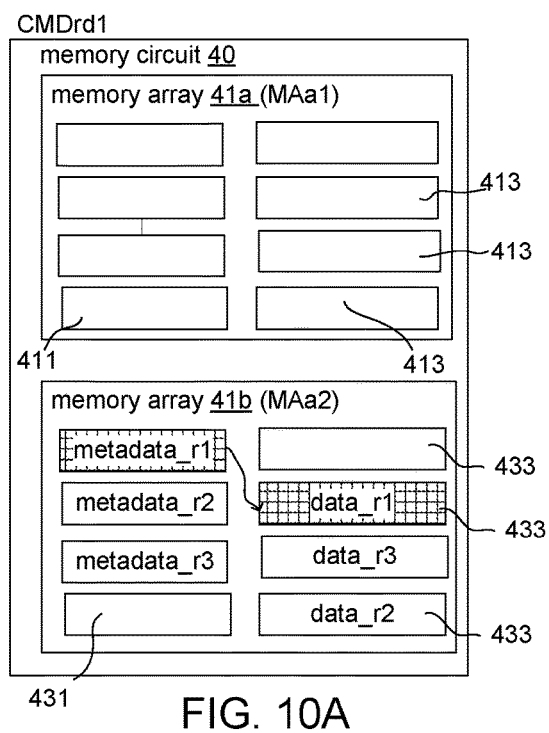
FIGS. 10A, 10B, 10C, and 10D are schematic diagrams illustrating how the memory controller utilizes the memory circuit shown in FIG. 7 to react to the command queue shown in FIG. 6

FIG. 10A represents the execution of the read command CMr1. The block 431 in the memory array 41b (MAa2) containing the read metadata (metadata_r1) is firstly acquired by the control logic 231a. Then, according to the read metadata (metadata_r1), the control logic 231a can obtain information about which of the block(s) 433 in the memory array 41b (MAa2) includes the read main data (data_r1). Later, the memory logic 231a can read the read main data data_r1) from the memory array 41b (MAa2).

Figure 10B:
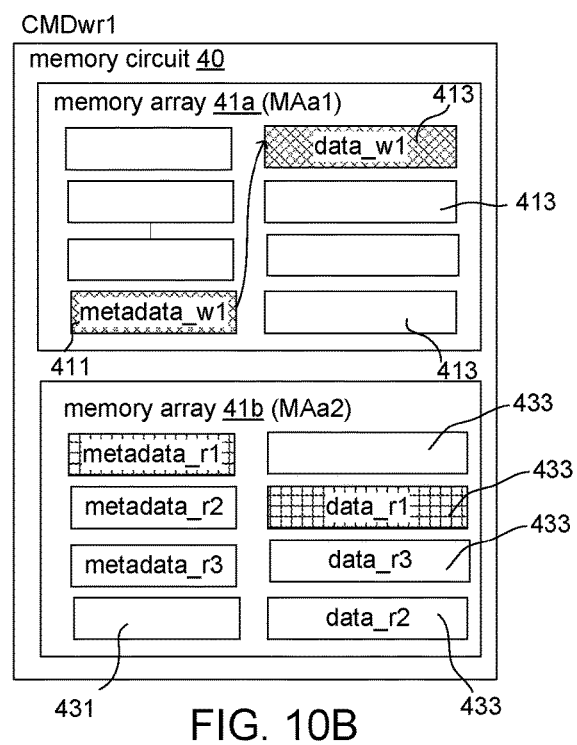

FIG. 10B represents the execution of the write command CMDwr1. The control logic 231a firstly programs the write main data (data_wr1) to the blocks 413 in the memory array 41a (MAa1). Then, the control logic 231a records location(s) of the block(s) 413 containing the write main data (data_wr1) as the write metadata (metadata_wr1) to the blocks 411.

Please refer to FIGS. 10A and 10B together. Although the write operation in FIG. 10B is executed after the read operation in FIG. 10A, the control logic 231a can immediately execute the write operation without waiting for the read operation because different memory arrays are used for the read operation and the write operation. The read operation in FIG. 10A is related to the blocks in the memory array 41b (MAa2), and the write operation in FIG. 10B is related to the blocks in the memory array 41a (MAa1).

According to the embodiment of the present disclosure, even if the memory arrays 41a (MAa1), 41b (MAa2) share the same bus 42 and the same channel 231, operations being performed to the memory arrays 41a (MAa1), 41b (MAa2) can be independent based on the interleaving access control. The accesses to the memory array 41a (MAa1), 41b (MAa2) being performed by the control logic 231a are proceeded by the memory interface circuit 231b.

Therefore, as soon as the memory controller 230 receives the write command CMDwr1, the control logic 231a can program the write main data (data_w1) to the memory array 41a (MAa1) regardless whether the control logic 231a finishes the read operation or not.

FIG. 10O represents the execution of the read command CMDrd2. The blocks 431 in the memory array 41b (MAa2) containing the read metadata (metadata_r2) is firstly acquired by the control logic 231a, Then, according to the read metadata (metadata_r2), location(s) of the block(s) 433 containing the read main data (data_r2) is obtained. Later, the control logic 231b can read the read main data (data_r2) from the memory array 41b (MAa2) through the memory interface circuit 231b.

Figure 10C:
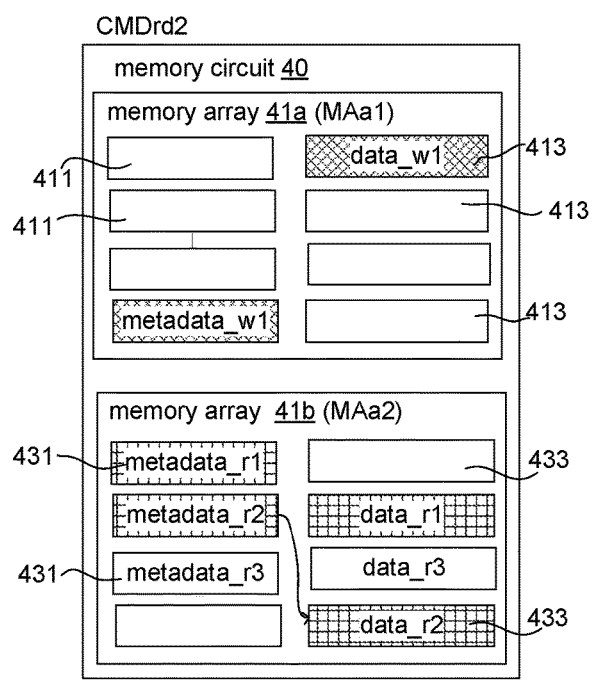

Please refer to FIGS. 10B and 10O together. Although the read operation in FIG. 10O is executed after the write operation in FIG. 10B, the control logic 2311b can immediately execute the read operation without waiting for the write operation because different memory arrays are used for the read operation and the write operation. The write operation in FIG. 10B is related to the blocks in the memory array 41a (MAa), and the read operation in FIG. 10C is related to the blocks in the memory array 41b (MAa2).

As illustrated above, operations being performed to the memory arrays 41a, 41b are independent. Therefore, as soon as the memory controller 230 receives the read command CMDrd2, the control logic 231a can read the read main data (data_r1) from the memory array 41b (MAa2) regardless whether the control logic 231a finishes the write operation or not.

Figure 10D:
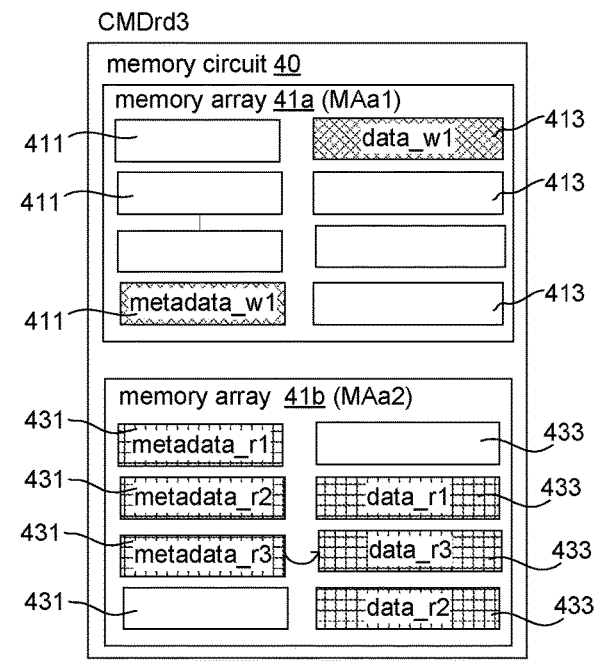

FIG. 10D represents the execution of the read command CMDrd3. The block 431 in the memory array 41b (MAa2) containing the read metadata (metadata_r3) is firstly acquired by the control logic 231a. Then, according to the read metadata (metadata_r3), location(s) of the block(s) 433 storing the read data (data_r3) are obtained. Later, the control logic 231a can read the read data (data_r3) from the memory array 41b (MAa2) accordingly. The read operations in response to the read command CMDrd2 and the read command CMDrd3 are executed in order.

As mentioned above, execution of the write command can be 10 times of the execution of the read command. Therefore, it is possible that the memory controller 230 finishes execution of the read command CMDrd2 and the read command CMDrd3 before finishing the write command CMDwr1. In other words, the excess waiting time of the read command CMDrd2 and the read command CMDrd3 can be dramatically reduced.

Once usage of the memory arrays is planned in accordance with the command type in advance, the efficiency of accessing the memory device can be increased because the read specific application and the write specific application can be executed concurrently but separately. Therefore, the map loading application and the write specific application such as the route recording application do not influence each other. Instead, the map loading application and the route recording application can operate in an individual and parallel manner.

Figure 11:
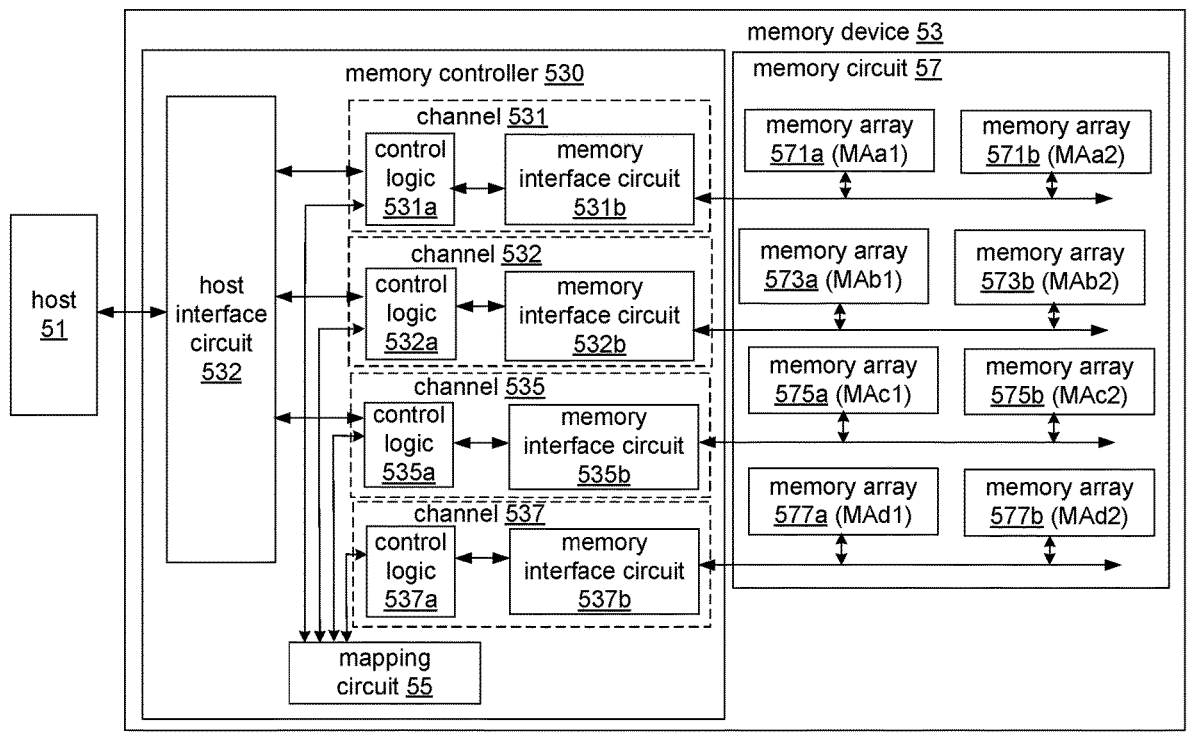
FIG. 11 is a schematic diagram illustrating that an electronic device uses a memory device including four memory arrays.

FIG. 11 is a schematic diagram illustrating that an electronic device uses a memory device including four memory arrays. As the connections between the host 51 and the memory device 53, and the components and interconnections between the components in the memory device 53 are similar to the ones described in FIG. 4, detail descriptions about which are omitted.

In FIG. 11, the memory controller 531 includes four channels 531, 532, 535, 537, which are respectively corresponding to four sets of memory arrays (571a and 571b), (573a and 573b), (575a and 575b), (577a and 577b). The channel 531 having the control logic 531a and the memory interface circuit 531b is corresponding to the first set of memory arrays 571a (MAa1), 571b (MAa2). The channel 532 having the control logic 532a and the memory interface circuit 532b is corresponding to the second set of memory arrays 573a (MAb1), 573b (MAb2). The channel 535 having the control logic 535a and the memory interface circuit 535b is corresponding to the third set of memory arrays 575a (MAc1), 575b (MAc2), The channel 537 having the control logic 537a and the memory interface circuit 537b is corresponding to the fourth set of memory arrays 577a (MAd1), 577b (MAd2). All the control logics 531a, 532a, 535a, 537a, are electrically connected to the host interface circuit 532, and the mapping circuit 55. As illustrated above, the mapping circuit 55 can be implemented with an SDRAM, an NVM, or a combination of both.

Figure 12:
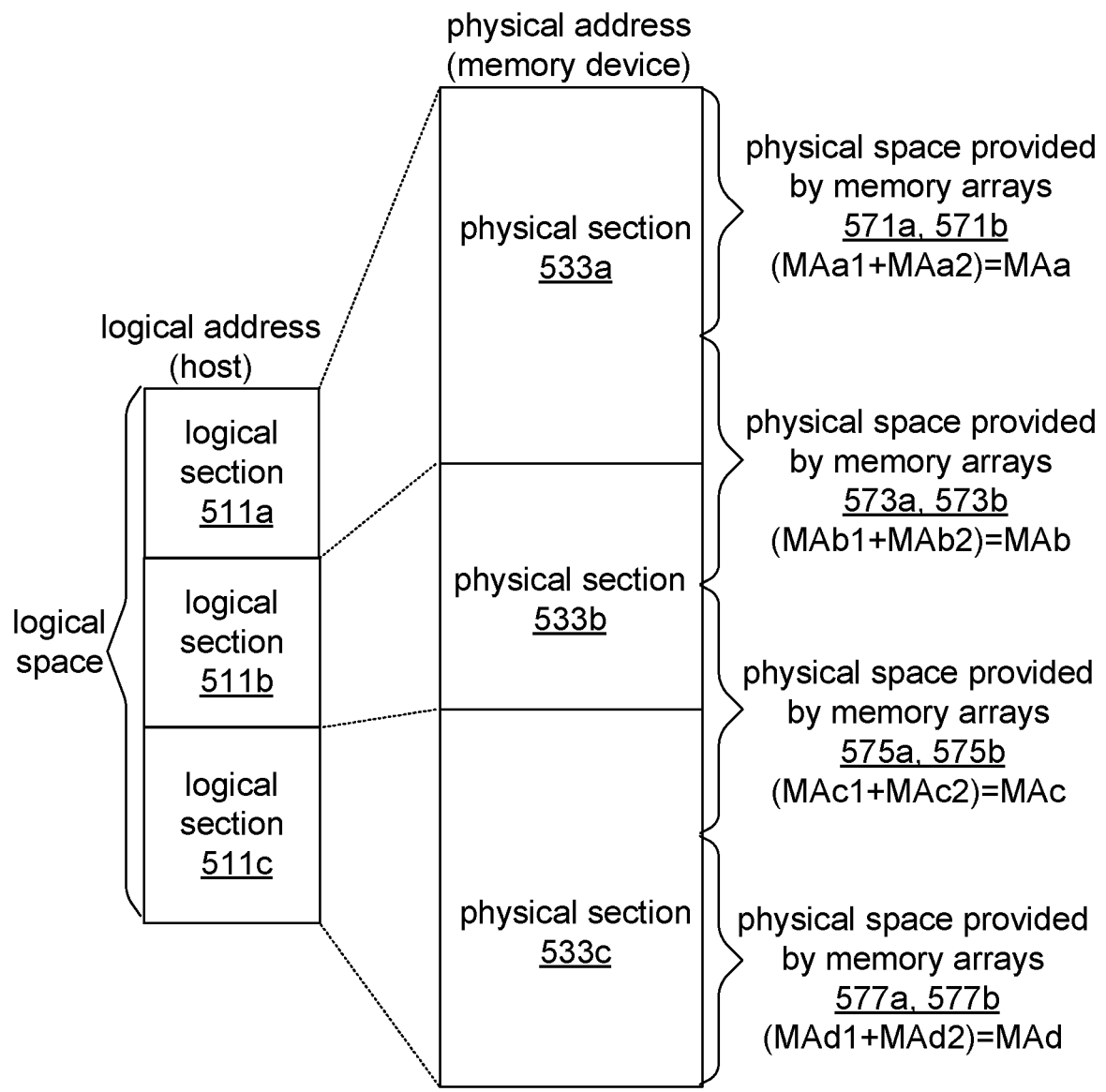
FIG. 12 is a schematic diagram illustrating an exemplary address translation mechanism of the electronic device shown in FIG. 11.

FIG. 12 is a schematic diagram illustrating an exemplary address translation mechanism of the electronic device shown in FIG. 11. In the embodiment, it assumed that the logical space used by the host is divided into three logical sections 511a, 511b, 511c. If the memory device complies with SCSI specification, the logical sections 511a, 511b, 511c represent different LUNs. If the memory device complies with eMMC specification, the logical sections 511a, 511b, 511c may represent different partitions. The host access these logical sections 511a, 511b, 511c through logical addresses.

The physical space provided by memory arrays 571a (MAa1), 571b (MAa2) are collectively defined as a joint physical space MAa; the physical space provided by memory arrays 573a (MAb1), 573b (MAb2) are collectively defined as a joint physical space MAb; the physical space provided by memory arrays 575a (MAc1), 575b (MAc2) are collectively defined as a joint physical space MAc; and the physical space provided by memory arrays 577a (MAd1), 577b (MAd2) are collectively defined as a joint physical space Mad. The joint physical spaces MAa, MAb, MAc, Mad are collected together and divided into three physical sections 533a, 533b, 533c. The logical sections 511a, 511b, 511c are mapped to the physical sections 533a, 533b, 533c in a one-by-one manner.

The logical sections 511*a*. 511*b*, 511*c* are assumed to be accessed by a write-oriented application, an arbitrary type application, and a read-oriented application, respectively. For the write-oriented application, execution of the write command CMDwr is critical, and the write main data should be programmed to the memory circuit as soon as possible. For the read-oriented application, execution of the read command CMDrd is critical and should be performed immediately, and the read main data in the memory circuit should be read out as soon as possible. Relatively, the arbitrary type application is more tolerant to the execution duration. Thus, the memory controller may perform the access command (including the read command CMDrd and the write command CMDwr) issued by the arbitrary type application after the write command issued by the write-oriented application and the read command issued by the read-oriented application finish.

In the embodiment, the physical section 533*a* includes the whole joint physical space MAa (the memory arrays 571*a* (MAa1), 571*b* (MAa2)) and some of the joint physical space MAb (for example, the memory array 573*a* (MAb1)); the physical section 533*b* includes the rest of the joint physical space MAb (for example, the memory array 573*b* (MAb2)) and some of the joint physical space Mac (for example, the memory array 575*a* (MAc1)); and the physical section 533*c* includes the rest of the joint physical space MAc (for example, the memory array 575*b* (MAc2)) and the whole joint physical space Mad (the memory arrays 577*a* (Mad1), 577*b* (Mad2)).

As shown in FIG. 12, the memory arrays for providing the physical spaces of the physical section 533*a* and the physical section 533*c* are separate. That is, the physical spaces of the physical sections corresponding to the write-oriented and the read-oriented applications are not shared. Alternative speaking, the logical section 511*a* assigned for the write-oriented application is corresponding to the physical space provided by the memory arrays 571*a* (MAa1), 571*b* (MAa2), 573*a* (MAb1), and the logical section 511*c* assigned for the read-oriented application is corresponding to the physical space provided by the memory arrays 575*b* (MAc2), 577*a* (MAd1), 577*b* (MAd2).

Therefore, the write command CMDwr issued by the write-oriented application programs the write metadata (metadata_wr) and the write main data (data_wr) to the memory arrays 571*a* (MAa1), 571*b* (MAa2), 573*a* (MAb1) and does not have any chance to invade the physical spaces provided by the memory arrays 575*b* (MAc2), 577*a* (Mad1), 577*b* (Mad2), Similarly, the read command CMDrd issued by the read-oriented application reads the read metadata (metada_rd) and the read main data (data_rd) only from the memory arrays 575*b* (MAc2), 577*a* (Mad1), 577*b* (Mad2) and does not have any chance to access the physical spaces provided by the memory arrays 571*a* (MAa1), 571*b* (MAa2), 573*a* (MAb1). Alternatively speaking, an invisible barrier is formed between the write commands CMDwr originated from the write-oriented application and the memory arrays 575*b* (MAc2), 577*a* (Mad1), 577*b* (Mad2), and another invisible barrier is formed between the read commands CMDrd originated from the read-oriented application and the memory arrays 571*a* (MAa1), 571*b* (MAa2), 573*a* (MAb1).

With such place planning of the memory arrays, the read operation and write operation can be executed by the memory controller simultaneously. In consequence, the performance of read-while-write access, such as the example of the digital dashboard application described above, can be improved because both the map loading application and the route recording application can continuously and independently operate.

Figure 13:
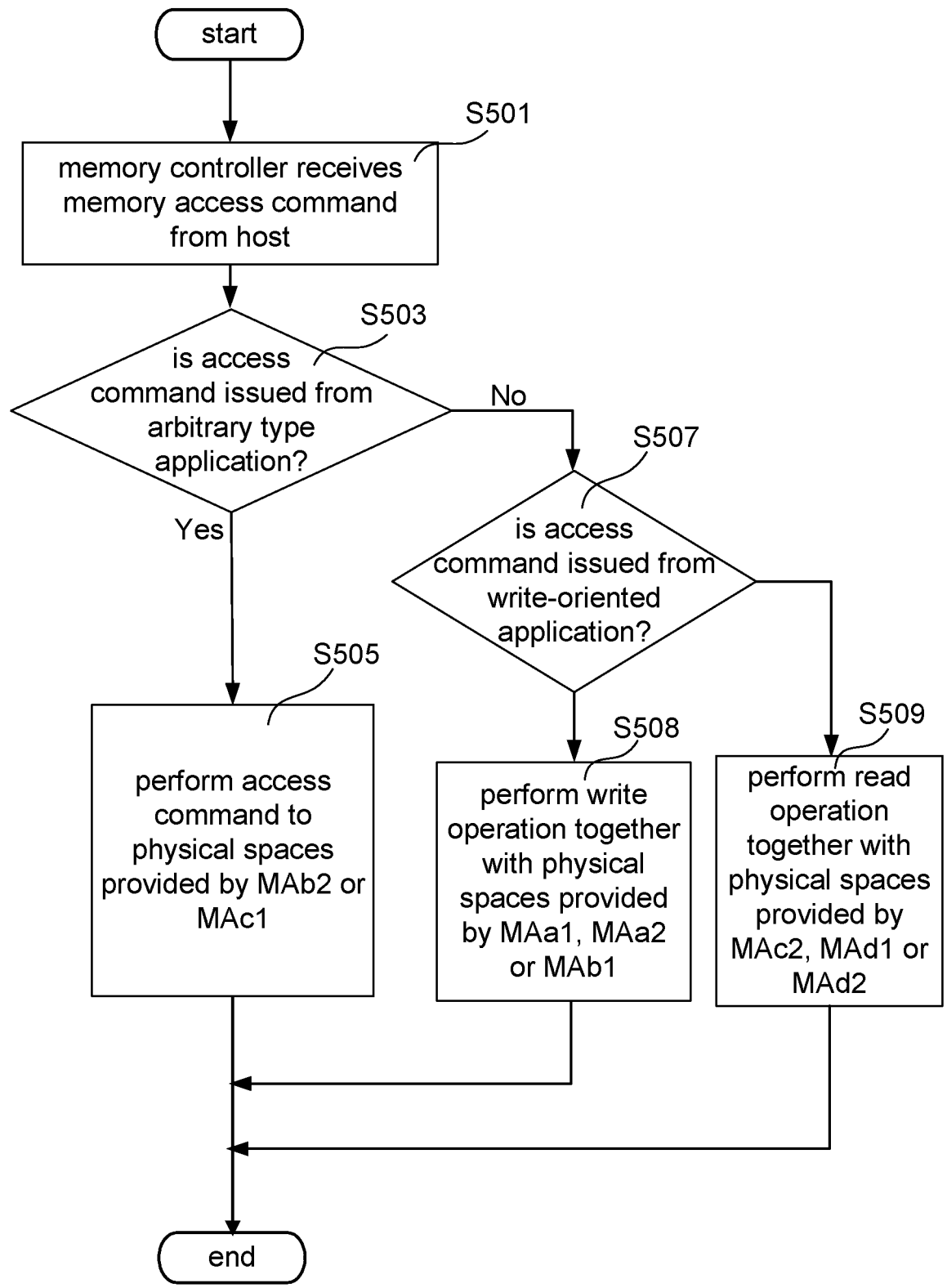
FIG. 13 is a flow diagram illustrating the operation processing procedure when the memory device shown in FIG. 11 utilizing the space arrangement shown in FIG. 12 receives an access command from the host.

FIG. 13 is a flow diagram illustrating a command processing procedure when the memory device shown in FIG. 11 utilizing the space arrangement shown in FIG. 12 receives an access command from the host. Firstly, the memory controller 530 receives the memory access command from the host 51 (step S501). The memory access command can be a read command or a write command, and the memory access command can be originated from any types of applications.

Then, the memory controller 530 determines whether the access command is issued by an arbitrary type application (step S503), If the determination result of step S503 is positive, the memory controller 530 performs the access command to the physical spaces provided by the memory arrays 573*b* (MAb2), 575*a* (MAc1) (step S505), In step S505, the access command can be a write command CMDwr or a read command CMDrd.

In a case that the determination result of step S503 is negative, the memory controller 530 further determines whether the access command is issued from the write-oriented application (step S507). When the access command is issued from the write-oriented application, the memory controller 530 performs the write operation together with the physical space provided by memory arrays 571*a* (MAa1), 571*b* (MAa2), 573*a* (MAb1) (step S508). When the access command is issued from the read-oriented application, the memory controller 530 performs the read operation together with the physical space provided by the memory arrays 575*b* (MAc2), 577*a* (MAd1), 577*b* (Mad2).

Figure 14:
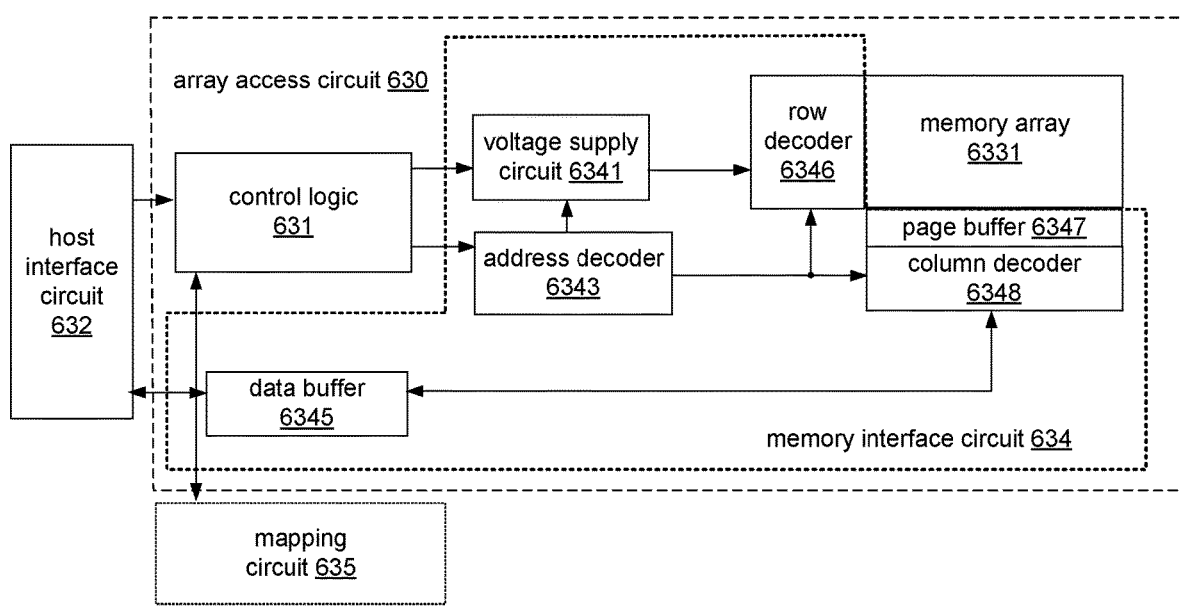
FIG. 14 is a schematic diagram illustrating a memory interface circuit specific to a memory array.

FIG. 14 is a schematic diagram illustrating an array access circuit. A memory circuit 630 including a host interface circuit 632, a mapping circuit 635, and an array access circuit 630 is shown. The array access circuit 630 is electrically connected to the host interface circuit 632 and the mapping circuit 635. The array access circuit 630 corresponds to a channel, and the memory device may include multiple array access circuits in some applications. In such case, the host interface circuit 632 and the mapping circuit 635 are jointly used by all memory access circuits in the memory device.

The array access circuit 630 includes a control logic 631, a memory array 6331, and a memory interface circuit 634. In practice, the number of array access circuits included in the memory circuit is determined by the number of memory arrays. The memory arrays are physically independent, and each of the memory arrays is accessed by an individual memory interface circuit. Thus, the number of memory arrays in the memory device should be equivalent to the number of the memory interface circuits in the memory device.

The memory interface circuit 364 connects the memory array 6331 to the control logic 631, the host interface circuit 632, and the mapping circuit 635. The memory interface circuit 634 includes a voltage supply circuit 6341, an address decoder 6343, a row decoder 6346, a page buffer 6347, a column decoder 6348, and a data buffer 6345.

The control logic 631 is electrically connected to the host interface circuit 632, the voltage supply circuit 6341, the address decoder 6343, and the mapping circuit 635. The address decoder 6343 is electrically connected to the voltage supply circuit 6341, the row decoder 6346, and the column decoder 6348. The page buffer 6347 is placed in between the memory array 6331 and the column decoder 6348, and the data buffer 6345 is electrically connected in between the column decoder 6348 and the host interface circuit 632.

The control logic 631 receives the access command and the logical address from the host interface circuit 632. Then, the control logic 631 maps the logical addresses to the physical addresses and controls voltage values of output voltages to be generated by the voltage supply circuit 6341. Usually, the output voltage corresponding to the erase command is greater than the output voltage corresponding to the programming command, and the output voltage corresponding to the programming command is greater than the output voltage corresponding to the read command.

Meanwhile, the address decoder 6343 decodes a physical address to a column address and a row address, which are respectively transmitted to the column decoder 6348 and the row decoder 6346. With the column address and the row address, a certain page and/or a certain block in the memory array 6331 is selected.

The data buffer 6345 buffers the read/write metadata and main data between the host interface circuit 632 and the column decoder 6348, and the page buffer 6347 buffers the read/write main data between the memory array 6331 and the column decoder 6348. Thus, the write main data originated from the host are propagated through the data buffer 6345 and the page buffer 6347 to the memory array 6331, and the write metadata generated by the control logic 631 are recorded at the memory array 6331 through the use of the page buffer 6347. On the other hand, the control logic 631 acquires the read metadata through the page buffer 6347, and the read main data are propagated from the memory array 6331 through the page buffer 6347 and the data buffer 6345 to the host.

In practice, the memory device may include multiple array access circuits and these array access circuits may jointly share the same selection signal (that is, a "Chip Enable" signal) and/or integrated into the same package. Regardless of the sharing of the selection signal and the package type, the memory arrays in the array access circuits are corresponding to different memory interface circuits and operate independently. With the separate memory interface circuits, access to the memory arrays can be performed in parallelism, and the performance of the memory device can be accelerated.

In addition to the digital dashboard, the proposed access method can be applied to the systems requiring different sensitivity levels of authority control, and the electronic device can be cellular phones, video game players and so forth. For example, for a cellular phone, the memory arrays for storing users' personal data and the system setup function can be different. Alternatively, for a video game player, the memory arrays for storing the system environment parameters and the user-specific records can be different. By applying the access method of the present disclosure, the conflictions between applications having different attributes can be avoided, and accessing the data stored in different memory arrays will not conflict with each other.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, being electrically connected to a host and comprising:
    a memory circuit, comprising:
        a first memory array, configured to provide a first physical space; and
        a second memory array, configured to provide a second physical space; and
    a memory controller, configured to receive an access command from the host, wherein
    the memory controller performs the access command to the first memory array when the access command is a first type of command,
    the memory controller performs the access command to the second memory array when the access command is a second type of command, and
    the memory controller further comprises at least one control logic, wherein the at least one control logic receives a first main data from the host, stores the first main data to the first memory array, and stores a first metadata indicating storage locations of the first main data to the first memory array,
    wherein the first memory array and the second memory array are non-volatile memory and the first main data and the first metadata are stored in the first memory array.

2. The memory device according to claim 1, wherein the memory controller provides a flash translation layer, wherein
    the flash translation layer maps a logical address to a physical address within the first physical space when the access command is the first type of command, and
    the flash translation layer maps the logical address to another physical address within the second physical space when the access command is the second type of command.

3. The memory device according to claim 2, wherein
    the flash translation layer maps a first logical section utilized by the host to a first physical section provided by the memory circuit, and
    the flash translation layer maps a second logical section utilized by the host to a second physical section provided by the memory circuit.

4. The memory device according to claim 3, wherein the first physical section comprises the first physical space, and the second physical section comprises the second physical space.

5. The memory device according to claim 1, wherein the at least one control logic configured to utilize the first physical space to perform the access command when the access command is the first type of command, and utilize the second physical space to perform the access command when the access command is the second type of command.

6. The memory device according to claim 5, wherein the memory controller further comprises:
    at least one memory interface circuit, electrically connected to the at least one control logic and the first memory array.

7. The memory device according to claim 5, wherein the memory controller further comprises:
    a mapping circuit, electrically connected to the at least one control logic and the first memory array, configured to store a copy of the first metadata.

8. The memory device according to claim 5, wherein
    the at least one control logic acquires a second metadata indicating storage locations of a second main data, acquires the second main data from the second physical space according to the second metadata, and transmits the second main data to the host.

9. The memory device according to claim 5, wherein the memory controller further comprises a host interface circuit, wherein the host interface circuit is electrically connected to the host and the at least one control logic.

10. The memory device according to claim 1, wherein the first type of command is a write command, and the second type of command is a read command.

11. The memory device according to claim 1, wherein the memory controller performs the second type of command as the access command during the memory controller is performing another access command which is the first type of command.

12. An access method of a memory device, the memory device comprising a first memory array and a second memory array, wherein the memory device is electrically connected to a host, the method comprising:
 providing a first physical space by the first memory array and a second physical space by the second memory array;
 receiving, by a memory controller, an access command from the host;
 performing, by the memory controller, the access command to the first physical space when the access command is a first type of command;
 performing, by the memory controller, the access command to the second physical space when the access command is a second type of command; and
 wherein the step of performing the access command to the first physical space when the access command is the first type of command further comprises:
  receiving a first main data from the host;
  storing the first main data to the first physical space; and
  storing a first metadata indicating storage locations of the first main data to the first physical space,
 wherein the first memory array and the second memory array are non-volatile memory and the first main data and the first metadata are stored in the first physical space.

13. The access method according to claim 12, further comprising:
 providing a flash translation layer;
 mapping a logical address to a physical address within the first physical space by the flash translation layer when the access command is the first type of command; and
 mapping the logical address to another physical address within the second physical space by the flash translation layer when the access command is the second type of command.

14. The access method according to claim 13, further comprising:
 mapping a first logical section utilized by the host to a first physical section provided by the memory device, and
 mapping a second logical section utilized by the host to a second physical section provided by the memory device.

15. The access method according to claim 14, wherein the first physical section comprises the first physical space, and the second physical section comprises the second physical space.

16. The access method according to claim 12, wherein the memory device comprises a mapping circuit, and the step of performing the access command to the first physical space when the access command is the first type of command further comprising:
 storing a copy of the first metadata to the mapping circuit.

17. The access method according to claim 12, wherein the step of performing the access command to the second physical space when the access command is the second type of command further comprising:
 acquiring a second metadata indicating storage locations of a second main data;
 acquiring the second main data from the second physical space according to the second metadata; and
 transmitting the second main data to the host.

18. The access method according to claim 12, wherein the first type of command is a write command, and the second type of command is a read command.

19. The access method according to claim 13, wherein the memory controller performs the second type of command as the access command during the memory controller is performing another access command which is the first type of command.

* * * * *